(12) United States Patent
Clayton, Jr. et al.

(10) Patent No.: US 9,512,760 B2
(45) Date of Patent: Dec. 6, 2016

(54) AFTERTREATMENT SYSTEM IMPLEMENTING LOW-TEMPERATURE SCR

(71) Applicant: Caterpillar Inc., Peoria, IL (US)

(72) Inventors: Robert Dale Clayton, Jr., Peoria, IL (US); Thomas Edward Paulson, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/599,337

(22) Filed: Jan. 16, 2015

(65) Prior Publication Data

US 2016/0169074 A1 Jun. 16, 2016

Related U.S. Application Data

(63) Continuation-in-part of application No. 14/570,775, filed on Dec. 15, 2014, now abandoned.

(51) Int. Cl.
*F01N 3/20* (2006.01)
*F01N 11/00* (2006.01)
(Continued)

(52) U.S. Cl.
CPC .......... *F01N 3/2053* (2013.01); *F01N 3/2013* (2013.01); *F01N 3/2046* (2013.01); *F01N 3/0878* (2013.01); *F01N 3/0885* (2013.01); *F01N 3/2006* (2013.01); *F01N 3/208* (2013.01); *F01N 3/2892* (2013.01); *F01N 11/00* (2013.01); *F01N 2240/02* (2013.01); *F01N 2240/16* (2013.01);
(Continued)

(58) Field of Classification Search
CPC .... F01N 3/0871; F01N 3/0878; F01N 3/0885; F01N 3/2006; F01N 3/2053; F01N 3/208; F01N 3/2892; F01N 11/00; F01N 2240/02; F01N 2240/16; F01N 2410/00; F01N 2550/02; F01N 2550/03; F01N 2560/021; F01N 2560/06; F01N 2570/18; F01N 2610/02; F01N 2610/146; F01N 2900/0602; F01N 2900/1402; F01N 2900/1404; F01N 2900/1602
USPC ......... 60/274, 276, 277, 284, 286, 287, 288, 60/295, 298, 300, 301, 303, 320, 324
See application file for complete search history.

(56) References Cited

U.S. PATENT DOCUMENTS 8,621,847 B2 1/2014 Gonze et al.
8,765,623 B2 7/2014 Chavannavar
(Continued)

FOREIGN PATENT DOCUMENTS

EP 2 754 871 A1 7/2014
WO WO 2009/103549 A1 8/2009

*Primary Examiner* — Jorge Leon, Jr.
(74) *Attorney, Agent, or Firm* — Finnegan, Henderson, Farabow, Garrett & Dunner, LLP (57) ABSTRACT

An aftertreatment system for an engine is disclosed. The aftertreatment system may include an exhaust passage configured to receive an exhaust flow from the engine, and an injector disposed in the exhaust passage and configured to inject reductant into the exhaust flow. The aftertreatment system may also include a bypass conduit fluidly connected to the exhaust passage downstream of the injector, at least one valve disposed in the bypass conduit and configured to divert exhaust gases from the exhaust passage into the bypass conduit, and a reductant storage device disposed in the bypass conduit and configured to store ammonia in the exhaust gases. The aftertreatment system may also include a control module configured to selectively operate the at least one valve.

17 Claims, 3 Drawing Sheets

(51) Int. Cl.
*F01N 3/28* (2006.01)
*F01N 3/08* (2006.01)

(52) U.S. Cl.
CPC ...... *F01N 2410/00* (2013.01); *F01N 2550/02* (2013.01); *F01N 2550/03* (2013.01); *F01N 2560/021* (2013.01); *F01N 2560/06* (2013.01); *F01N 2570/18* (2013.01); *F01N 2610/02* (2013.01); *F01N 2610/146* (2013.01); *F01N 2900/1402* (2013.01); *F01N 2900/1404* (2013.01); *F01N 2900/1602* (2013.01)

(56) References Cited

U.S. PATENT DOCUMENTS

| | | |
|---|---|---|
| 8,800,272 B2 | 8/2014 | Brahma et al. |
| 2011/0023463 A1 | 2/2011 | Dobson et al. |
| 2011/0030351 A1* | 2/2011 | Kato ............ F01N 3/0807 60/297 |
| 2011/0265455 A1* | 11/2011 | Hirota ............ F01N 3/206 60/285 |
| 2012/0023906 A1 | 2/2012 | Yezerets et al. |
| 2013/0239554 A1 | 9/2013 | Gonze et al. |

* cited by examiner

AFTERTREATMENT SYSTEM IMPLEMENTING LOW-TEMPERATURE SCR

RELATED APPLICATIONS

This application is a continuation-in-part application of U.S. application Ser. No. 14/570,775, filed Dec. 15, 2014, the contents of which are expressly incorporated herein by reference.

TECHNICAL FIELD

The present disclosure is directed to an aftertreatment system and, more particularly, to an aftertreatment system implementing low-temperature selective catalytic reduction (SCR).

BACKGROUND

Internal combustion engines, including diesel engines, gasoline engines, gaseous fuel-powered engines, and other engines known in the art exhaust a complex mixture of air pollutants. These air pollutants are composed of gaseous compounds including, among other things, the oxides of nitrogen ($NO_x$). In order to reduce $NO_x$ emissions into the atmosphere, some engine manufacturers have implemented a strategy called selective catalytic reduction (SCR). SCR is an exhaust treatment process where a reductant, most commonly urea (($NH_2$)$_2$CO) or a water/urea solution, is selectively injected from an onboard supply into the exhaust gas stream of an engine. The injected urea solution decomposes to form ammonia ($NH_3$), HCO, and $H_2O$, and the $NH_3$ is adsorbed onto a downstream substrate, often referred to as an SCR catalyst. $NH_3$ that is adsorbed by the SCR catalyst reacts with $NO_x$ in the exhaust gas to form water ($H_2O$) and diatomic nitrogen ($N_2$).

When exhaust temperatures are relatively low, such as after starting an engine that has cooled (sometimes referred to as a "cold start" condition), the injected urea solution does not fully decompose to $NH_3$ before reaching the SCR catalyst. As a result, the SCR catalyst can become clogged with urea deposits, thereby reducing its ability to store $NH_3$ and reduce $NO_x$ emissions. Moreover, any remaining $NH_3$ stored on the SCR catalyst may be insufficient to adequately reduce $NO_x$ emissions.

One attempt to reduce $NO_x$ emissions at relatively low temperatures is disclosed in U.S. Pat. No. 8,621,847 issued to Gonze et al. on Jan. 7, 2014 ("the '847 patent"). Specifically, the '847 patent discloses an engine exhaust system having an SCR catalyst and an air pump that directs ambient air to the SCR catalyst and to the exhaust manifold of the engine. A controller determines when the engine is shut off and actuates the pump to cool the SCR catalyst with the ambient air to a temperature at which its $NH_3$ storage capacity is increased. The controller then diverts the ambient air to the exhaust manifold and forces it through the exhaust system where it absorbs heat from the warm exhaust system components. Urea is injected into the warmed air and decomposes into $NH_3$ before being adsorbed on the now cooled SCR catalyst for later use under cold start conditions.

Though perhaps somewhat effective at increasing the $NH_3$ storage capacity of an SCR catalyst, the exhaust system of the '847 patent may not be practical in various applications. Particularly, the additional air pump and air conduit disclosed in the '847 patent may not be feasibly integrated into an exhaust system having strict packaging constraints. Additionally, the process of storing $NH_3$ in the SCR after the engine has stopped may be inefficient. Further, the SCR catalyst may not be optimally designed for storing $NH_3$ under varying conditions.

The exhaust system of the present disclosure addresses one or more of the needs set forth above and/or other problems of the prior art.

SUMMARY

In one aspect, the present disclosure is directed to an aftertreatment system for an engine. The aftertreatment system may include an exhaust passage configured to receive an exhaust flow from the engine, and an injector disposed in the exhaust passage and configured to inject reductant into the exhaust flow. The aftertreatment system may also include a bypass conduit fluidly connected to the exhaust passage downstream of the injector, at least one valve disposed in the bypass conduit and configured to divert exhaust gases from the exhaust passage into the bypass conduit, and a reductant storage device disposed in the bypass conduit and configured to store ammonia in the exhaust gases. The aftertreatment system may also include a control module configured to selectively operate the at least one valve.

In another aspect, the present disclosure is directed to a method of treating exhaust from an engine. The method may include receiving an exhaust flow from the engine, selectively injecting a reductant into the exhaust flow, and directing the exhaust flow and reductant to a reduction device. The method may further include selectively diverting exhaust gases to a reductant storage device, and selectively releasing ammonia from the reductant storage device to the reduction device.

In yet another aspect, the present disclosure is directed to an engine. The engine may include an engine block at least partially defining a plurality of cylinders and an exhaust system connectable to the engine. The exhaust system may include an exhaust passage configured to receive an exhaust flow from the plurality of cylinders, a first sensor configured to indicate a temperature of the exhaust flow, and an injector disposed in the exhaust passage and configured to inject a reductant into the exhaust flow. The exhaust system may further include a bypass conduit fluidly connected to the exhaust passage downstream of the injector, at least one valve disposed in the bypass conduit and configured to divert exhaust gases from the exhaust passage into the bypass conduit, and a reductant storage device disposed in the bypass conduit and configured to store ammonia from the mixture. The exhaust system may further include a second sensor configured to indicate a temperature of the reductant storage device and a control module configured to selectively operate the at least one valve based on the temperature of the exhaust flow and on the temperature of the reductant storage device. The exhaust system may further include a reduction device disposed in the exhaust passage downstream of the bypass conduit and configured to receive ammonia released from the reductant storage device.

DETAILED DESCRIPTION

Figure 1:
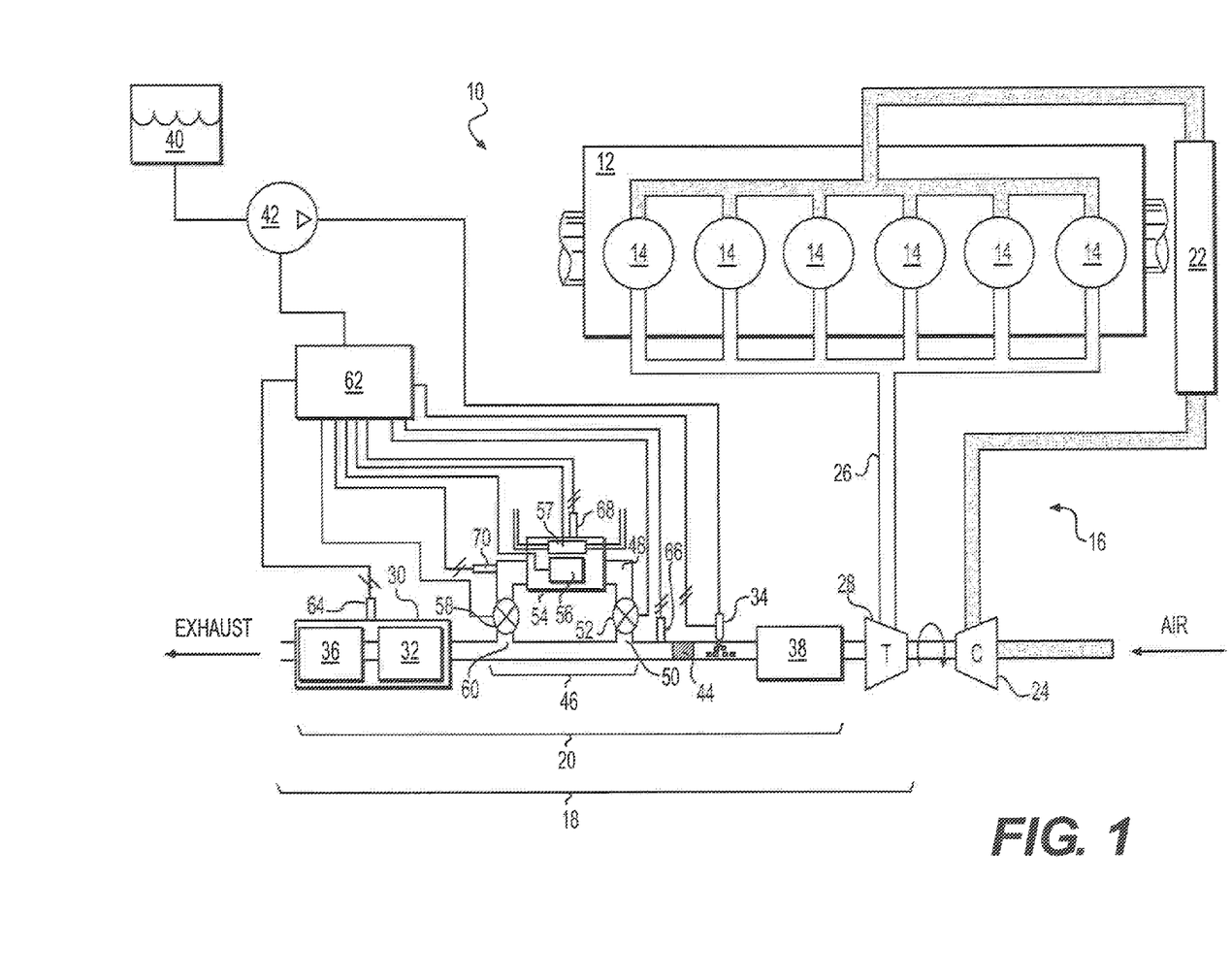
FIG. 1 is a diagrammatic illustration of an engine incorporating an exemplary disclosed aftertreatment system.

FIG. 1 illustrates an exemplary engine 10. For the purposes of this disclosure, engine 10 is depicted and described as a diesel-fueled, internal combustion engine. However, it is contemplated that engine 10 may embody any other type of combustion engine such as, for example, a gasoline or a gaseous fuel-powered engine burning compressed or liquefied natural gas, propane, methane, or any other suitable fuel. Engine 10 may include an engine block 12 at least partially defining a plurality of cylinders 14, and a plurality of piston assemblies (not shown) disposed within cylinders 14 to form a plurality of combustion chambers (not shown). It is contemplated that engine 10 may include any number of combustion chambers and that the combustion chambers may be disposed in an in-line configuration, in a "V" configuration, in an opposing-piston configuration, or in any other conventional configuration.

Multiple separate sub-systems may be associated within engine 10 and cooperate to facilitate the production of power and to simultaneously control the emission of pollutants to the atmosphere. For example, engine 10 may include an air induction system 16, an exhaust system 18, and an aftertreatment system 20. Air induction system 16 may be configured to direct air or an air and fuel mixture into engine 10 for subsequent combustion. Exhaust system 18 may exhaust byproducts of combustion to the atmosphere. Aftertreatment system 20 may function to reduce the discharge of regulated constituents by engine 10 to the atmosphere.

Air induction system 16 may include multiple components configured to condition and introduce compressed air into cylinders 14. For example, air induction system 16 may include an air cooler 22 located downstream of one or more compressors 24. Compressors 24 may be connected to pressurize inlet air directed through air cooler 22. It is contemplated that air induction system 16 may include different or additional components than described above such as, for example, a throttle valve, variable valve actuators associated with each cylinder 14, filtering components, compressor bypass components, and other known components that may be selectively controlled to affect an air-to-fuel ratio of engine 10, if desired. It is further contemplated that compressor 24 and/or air cooler 22 may be omitted, if a naturally aspirated engine is desired.

Exhaust system 18 may include multiple components that condition and direct exhaust from cylinders 14 to the atmosphere. For example, exhaust system 18 may include an exhaust passage 26 configured to receive an exhaust flow from engine 10. One or more turbines 28 may be fluidly connected to exhaust passage 26 and driven by the exhaust flow. It is contemplated that exhaust system 18 may include different or additional components than described above such as, for example, bypass components, an exhaust compression or restriction brake, an attenuation device, and other known components, if desired.

Turbine 28 may be located to receive exhaust leaving engine 10, and may be connected to one or more compressors 24 of air induction system 16 by way of a common shaft to form a turbocharger. As the hot exhaust gases exiting engine 10 move through turbine 28 and expand against vanes (not shown) thereof, turbine 28 may rotate and drive the connected compressor 24 to pressurize inlet air.

Aftertreatment system 20 may receive exhaust from turbine 28 and reduce particular constituents of the exhaust. Particularly, aftertreatment system 20 may include components configured to trap, catalyze, reduce, or otherwise remove regulated constituents from the exhaust flow of engine 10 prior to discharge to the atmosphere. In one example, aftertreatment system 20 includes a Selective Catalytic Reduction (SCR) device 30 having one or more serially-arranged catalyst substrates 32 located downstream from a reductant injector 34 disposed in exhaust passage 26. A gaseous or liquid reductant, most commonly urea $((NH_2)_2CO)$, a water/urea mixture, a water/urea/ammonium formate mixture, a hydrocarbon such as diesel fuel, or ammonia gas ($NH_3$), may be sprayed or otherwise advanced into the exhaust flow within exhaust passage 26 at a location upstream of catalyst substrate(s) 32 by injector 34. The reductant may include $NH_3$ or may decompose to form $NH_3$ (along with other byproducts), and the $NH_3$ may be adsorbed onto the surface of catalyst substrate(s) 32. Adsorbed $NH_3$ may react with $NO_x$ (NO and $NO_2$) in the exhaust gas to form water ($H_2O$) and elemental nitrogen ($N_2$). To prevent extra $NH_3$ that did not react with $NO_x$ from being released into the atmosphere, known as $NH_3$ slip, a cleanup catalyst 36 (AMOX) may be positioned downstream of catalyst substrate(s) 32 that oxidizes residual $NH_3$ in the exhaust to form water and elemental nitrogen, if desired.

The reduction process performed by SCR device 30 may be most effective when a concentration of NO to $NO_2$ supplied to SCR device 30 is about 1:1. To help provide the correct concentration of NO to $NO_2$, aftertreatment system 20 may further include an oxidation catalyst 38 upstream of SCR device 30. Oxidation catalyst 38 may be, for example, a diesel oxidation catalyst (DOC). As a DOC, oxidation catalyst 38 may include a porous ceramic honeycomb structure or a metal mesh substrate coated with a material, for example a precious metal, which catalyzes a chemical reaction to alter the composition of the exhaust. For instance, oxidation catalyst 38 may include a washcoat of palladium, platinum, vanadium, or a mixture thereof that facilitates the conversion of NO to $NO_2$.

In one embodiment, oxidation catalyst 38 may also perform particulate trapping functions. That is, oxidation catalyst 38 may be a catalyzed particulate trap such as a continuously regenerating particulate trap or a catalyzed continuously regenerating particulate trap. A particulate trap is a filter designed to trap or collect particulate matter.

The process of injecting reductant upstream of catalyst substrate(s) 32 may be known as dosing catalyst substrate(s) 32. To facilitate the dosing of catalyst substrate(s) 32 by injector 34, an onboard supply 40 of reductant and a pressurizing device 42 may be associated with injector 34. The reductant sprayed into exhaust passage 26 may flow downstream with the exhaust flow from engine 10. A mixer 44 may be disposed within exhaust passage 26 at the location of injector 34 and configured to evenly spread the reductant throughout the exhaust passing through exhaust passage 26.

Using injector 34 to dose catalyst substrate(s) 32 may be undesirable under some operating conditions. For example, when exhaust temperatures are low, such as after a cold start, the reductant, particularly solutions containing urea, may not decompose at a high enough rate to form a sufficient quantity of $NH_3$ to achieve desired $NO_x$ levels before reaching catalyst substrate(s) 32. Urea that has not fully decomposed may form deposits on catalyst substrate(s) 32 (and other components of aftertreatment system 20) and reduce its ability to react with $NO_x$. Thus, aftertreatment system 20 may include a reductant storage system 46 configured to store a portion of the reductant in the exhaust flow that has already decomposed to form $NH_3$. The stored $NH_3$ may then be selectively released from reductant storage system 46 and returned to the exhaust flow under cold start conditions to react with $NO_x$ inside SCR device 30.

Reductant storage system 46 may include a bypass conduit 48 fluidly connected to exhaust passage 26. For example, an inlet 50 of bypass conduit 48 may be connected to exhaust passage 26 downstream of injector 34. At least one valve may be provided to fluidly connect bypass conduit 48 to exhaust passage 26. For example, a first valve 52 may be disposed in inlet 50 and configured to selectively divert gases from exhaust passage 26 into a reductant storage device 54 disposed in bypass conduit 48. Gases from exhaust passage 26 may be collectively referred to as "exhaust gases," and may include engine exhaust (e.g. combustion products), reductant, ammonia, and other materials traveling with the engine exhaust through exhaust passage 26.

Reductant storage device 54 may include a reductant storage catalyst configured to store $NH_3$. Reductant storage device 54 may include storage materials such as zeolite-containing materials, zeolites exchanged with transition metals (e.g. iron, copper, cobalt, silver, etc.), metal oxides (e.g. cerium oxide, zirconium oxide, manganese oxide etc.), mixed metal oxides, vanadium compounds, metal amines, or any other reductant storage material that stores and releases $NH_3$ within a desired temperature range. In some embodiments, storage materials may be selected to achieve $NH_3$ storage (or release) at particular temperature ranges or to improve certain associated chemical reactions. For example, storage materials that release $NH_3$ at relatively low temperatures (e.g. below about 150° C.) store $NH_3$ at an even lower temperature, which may not be easily achieved during normal vehicle operation and may require active cooling of the storage material. Conversely, storage materials that release $NH_3$ at relatively higher temperatures (e.g. above about 275° C.) may require supplemental heating in order to release $NH_3$ when exhaust temperatures are below a temperature at which the material releases $NH_3$. In other embodiments, storage materials may be chosen in order to reduce $NH_3$ oxidation and increase HCO hydrolysis on reductant storage device 54. In this way, reductant storage device 54 may be optimally designed for storing $NH_3$ under varying conditions, thereby allowing SCR device 30 to be optimally designed for reducing NOx.

Reductant storage device 54 may also be configured to release $NH_3$ back into exhaust passage 26 with the assistance of a heater 56. Heater 56 may include an electric heater (e.g. electric coil, induction heater, etc.), a fuel-fired burner, or any other suitable heater, and may be integral with or separate from reductant storage device 54. Heater 56 may be configured to heat reductant storage device 54 to a release temperature ($T_{Rel}$) at which $NH_3$ is released from the reductant storage material. $T_{Rel}$ may vary depending upon the storage materials included within reductant storage device 54. In some embodiments, a second valve 58 may also be disposed in an outlet 60 of bypass conduit 48 and configured to selectively return the $NH_3$ released from reductant storage device 54 into exhaust passage 26. Outlet 60 may be fluidly connected to exhaust passage 26 downstream of inlet 50 and upstream of SCR device 30.

Reductant storage device 54 may be further configured to store $NH_3$ with the assistance of a cooling device 57. Cooling device 57 may be configured to cool reductant storage device 54 and may be disposed within bypass conduit 48 or integral with or attached to reductant storage device 54. For example, cooling device 57 may include a heat exchanger in fluid communication with a coolant source via inlet and outlet conduits (as seen in FIG. 1). For instance, cooling device 57 may be supplied with engine coolant from an engine coolant circuit, liquid coolant from a dedicated coolant circuit, or air from a suitable air source (e.g., an ambient source, an engine compartment, air induction system 16, etc.). Cooling device 57 may also include pumps, valves, and sensors (e.g., temperature sensors, flow rate sensors, pressure sensors etc.) for controlling a flow of coolant through cooling device 57. Alternatively, cooling device 57 may embody an electric cooling device, such as a thermoelectric cooling device (e.g., a Peltier cooling device). Cooling device 57 may be configured to cool reductant storage device 54 to a storage temperature ($T_{store}$) at which sufficient quantities of $NH_3$ can be stored on the reductant storage material of reductant storage device 54. $T_{store}$ may vary depending upon the storage materials included within reductant storage device 54.

Positioning reductant storage device 54, heater 56, and cooling device 57 within bypass conduit 48 may allow aftertreatment system 20 to be used with engines having strict packaging constraints. For example, bypass conduit 48 may allow reductant storage device 54, heater 56, and cooling device 57 to be positioned in a convenient location some distance from exhaust passage 26. Further, separating reductant storage device 54, heater 56, and cooling device 57 from other components of aftertreatment system 20 may allow heating, cooling, $NH_3$ storage, and $NH_3$ release processes to be performed with greater control and less influence from the heat given off by aftertreatment system 20. Accordingly, the efficiency of the aftertreatment system may be improved.

Aftertreatment system 20 may also include components configured to help regulate the treatment of exhaust prior to discharge to the atmosphere. Specifically, aftertreatment system 20 may include a control module 62 in communication with one or more sensors 64, 66, 68, 70 and components of aftertreatment system 20 (e.g., supply 40, pressurizing device 42, injector 34, SCR device 30, and oxidation catalyst 38). Sensors 64-70 may be positioned throughout aftertreatment system 20 and generate signals indicative of an exhaust and/or component parameter such as, for example, a temperature (e.g. temperature of SCR device 30), a mass flow rate (e.g. exhaust mass flow rate through exhaust passage 26), an exhaust constituent level (e.g. $NO_x$, $CO_2$, NO, $NO_2$, etc.), a reductant concentration (e.g. urea, $NH_3$, hydrocarbon), etc. Based on the signals, control module 62 may determine, among other things, an amount of $NO_x$ being produced by engine 10, a reductant flow rate through portions of aftertreatment system 20 (e.g. supply 40, pressurizing device 42, injector 34 etc.), a performance parameter of SCR device 30 (e.g., a reduction efficiency), a history of the performance parameter (e.g., the reduction efficiency tracked over a period of time), an amount of reductant passing through catalyst substrate(s) 32, an amount of reductant stored in catalyst substrate(s) 32, and/or an amount of reductant (i.e. to yield an amount of $NH_3$) that should be sprayed by injector 34 into the exhaust flow of exhaust passage 26 to sufficiently reduce the $NO_x$ present within the exhaust at SCR device 30. Control module 62 may then regulate operation of injector 34 by generating an injection signal directing injector 34 to spray (or stop spraying) an appropriate amount of reductant into the exhaust flow of exhaust passage 26, such that an overall level of exhaust constituents being discharged to the atmosphere by exhaust passage 26 is less than a desired and/or regulated level.

Sensor 64 may include one or more sensors associated with SCR device 30 and configured to generate a signal indicative of parameter relating to the performance of SCR device 30. For example, sensor 64 may include a $NO_x$ sensor disposed downstream of catalyst substrate(s) 32 and configured to determine a concentration of $NO_x$ in the exhaust flow exiting SCR device 30. Sensor 64 may also include a cross-sensitive sensor configured to determine concentrations of $NO_x$ and/or $NH_3$ in the exhaust flow exiting SCR device 30. Sensor 64 may further include a temperature sensor configured to determine a temperature of SCR device 30. Based on the signal from sensor 64 and other determinations made by control module 62, control module 62 may determine an appropriate amount of reductant to administer into the exhaust flow of exhaust passage 26, such that an overall level of $NO_x$ being discharged to the atmosphere is less than a desired and/or regulated level.

Sensor 66 may be configured to determine a temperature of the exhaust flow in exhaust passage 26. Sensor 66 may be disposed in exhaust passage 26 at any suitable location, such as downstream of engine 10, downstream of turbine 28, downstream of oxidation catalyst 38, or downstream of injector 34. Control module 62 may determine the temperature of the exhaust flow entering SCR device 30 and/or bypass conduit 48 based on a signal from sensor 66.

Sensor 68 may be configured to determine a temperature of reductant storage device 54. For example, in one embodiment, sensor 68 may be a temperature sensor positioned upstream or downstream of reductant storage device and configured to indicate the temperature of reductant storage device 54 based on the temperature of the exhaust flow entering or exiting reductant storage device 54. In another embodiment, sensor 68 may be embedded within reductant storage device 54. Control module 62 may be configured to determine the temperature of reductant storage device based on a signal from sensor 68.

Sensor 70 may be configured to determine an $NH_3$ concentration downstream of reductant storage device 54. For example, sensor 70 may be an $NH_3$ sensor disposed in bypass conduit 48 downstream of reductant storage device 54. In one embodiment, sensor 70 may be located between valve 58 and reductant storage device 54. In another embodiment, sensor 70 may be located between valve 58 and outlet 60 of bypass conduit 48. Control module 62 may be configured to determine the $NH_3$ concentration downstream of reductant storage device based on a signal from sensor 70.

It is contemplated that any one or more of sensors 64-70 may alternatively embody a virtual sensor. A virtual sensor may produce a model-driven estimate based on one or more known or sensed operational parameters of engine 10 and/or aftertreatment system 20. For example, based on a known operating speed, load, temperature, boost pressure, ambient conditions (humidity, pressure, temperature, etc.), and/or other parameters of engine 10, a model may be referenced to determine an amount of $NO_x$ produced by engine 10. Similarly, based on a known or estimated $NO_x$ production of engine 10, a flow rate of reductant leaving supply 40 or injector 34, a reductant injection history, and temperatures within aftertreatment system 20, a model of reductant storage within SCR device 30 and reductant storage device 54 may be generated. As a result, any signal directed from sensors 64-70 to control module 62 may be based on calculated and/or estimated values rather than direct measurements, if desired. It is contemplated that rather than a separate element, these virtual sensing functions may alternatively be accomplished by control module 62, if desired.

It should be appreciated that control module 62 may include a memory, a secondary storage device, a processor, and any other components for running an application. Control module 62 may include a number of modules that may include a processor, memory, and other components for running applications. Various other circuits may be associated with control module 62, such as power supply circuitry, signal conditioning circuitry, actuator driver circuitry, and other types of circuitry.

Figure 2:
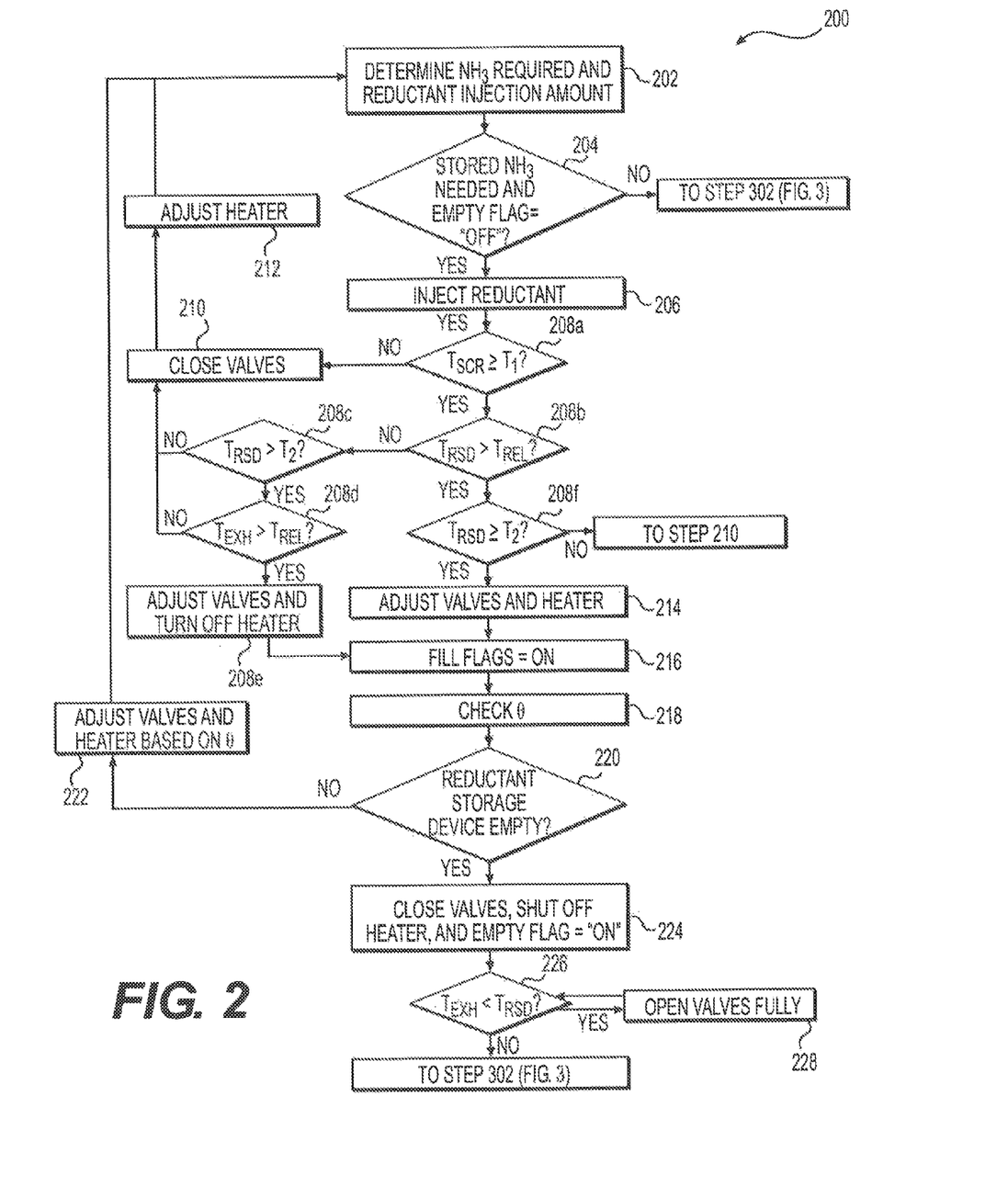
FIG. 2 is a flow chart of an exemplary disclosed process for treating exhaust that may be performed with the aftertreatment system of FIG. 1.

Exemplary processes that may be performed with aftertreatment system 20 for releasing $NH_3$ from reductant storage device 54 and for replenishing the released $NH_3$ will be discussed below with regard to FIGS. 2-3.

INDUSTRIAL APPLICABILITY

The disclosed aftertreatment system may be used in any machine or power system application having an exhaust system that implements SCR, where it is beneficial to store reductant for use under cold start conditions. The disclosed aftertreatment system finds particular applicability within mobile machines that are started and operated under a wide range of ambient conditions. Operations of exemplary aftertreatment system 20 will now be described in detail.

During operation of engine 12, a mixture of air and fuel may be combusted in cylinders 14, thereby generating a flow of exhaust gases (e.g. engine exhaust). The flow of exhaust gases may be guided from engine 10 into exhaust system 18 via exhaust passage 26. As the exhaust gases travel though exhaust passages 26 and expand against vanes (not shown) of turbine 28, the gasses may drive the pressurization of combustion air drawn into engine 10. Aftertreatment system 20 may trap, catalyze, reduce, or otherwise remove regulated constituents from the exhaust exiting turbine 28 prior to discharge to the atmosphere.

For example, aftertreatment system 20 may periodically inject reductant into exhaust passage 26 with injector 34 based on an injection signal from control module 62. Control module 62 may receive signals from one or more sensors 64-70 indicative of operating parameters, such as, for example, an exhaust flow rate, a $NO_x$ concentration in the exhaust flow, a temperature of SCR device 30, a temperature of reductant storage device 54, and a temperature of the exhaust flow in exhaust passage 26. Based on the signals, control module 62 may initiate an injection process 200 as shown in FIG. 2. During injection process 200, control module 62 may determine an amount of $NH_3$ needed to reduce $NO_x$ emissions to desired levels (e.g. regulated levels) and an appropriate amount of reductant to administer into the exhaust flow of exhaust passage 26 in order to yield the needed amount of $NH_3$ without forming deposits within aftertreatment system 20 (Step 202). The amounts of $NH_3$ and reductant may be determined from a map that correlates $NO_x$ reduction, reductant decomposition, and deposit formation with current operating conditions, such as the conditions determined by sensors 64-70. The map may be stored in control module 62 and may be generated from empirical test results gathered at various operating conditions.

Based on the map determination made in step 202, control module 62 may then determine whether additional $NH_3$ is needed to sufficiently reduce $NO_x$ than can be provided by the determined reductant injection amount under the current operating conditions (Step 204). For example, during cold start conditions, reductant may not be injected until the temperature of the exhaust flow ($T_{Exh}$) reaches a minimum injection temperature ($T_{Inj1}$) that is sufficient to decompose useful amounts of $NH_3$ without forming deposits on the components of aftertreatment system 20. $T_{Inj1}$ may vary depending upon current operating conditions, and may be about 180-220° C. (e.g. 200° C.). $T_{Inj1}$ may be determined using the map stored within control module 62. When $T_{Exh}$ is below $T_{Inj1}$, control module may rely only on reductant storage device 54 to provide the $NH_3$ required to sufficiently reduce $NO_x$ levels. Once $T_{Inj1}$ has been achieved, small amounts of reductant may also be injected without forming deposits within aftertreatment system 20 while $NH_3$ is released from reductant storage device. As $T_{Exh}$ increases, more reductant may be injected from injector 34 while less $NH_3$ is required from reductant storage device 54. When operating conditions permit for large enough injection amounts to produce enough $NH_3$ to sufficiently reduce $NO_x$ in the exhaust flow, no additional $NH_3$ may be required. When no additional $NH_3$ is needed to sufficiently reduce $NO_x$ levels in the exhaust flow without forming deposits within aftertreatment system 20, or if an EMPTY FLAG is not in the "Off" position (as discussed below), control module 62 may advance to a second injection process 300 (referring to FIG. 3). When additional $NH_3$ is needed, control module 62 may command injector 34 to spray the determined injection amount, if any, into exhaust conduit 26 (Step 206) and proceed to the next step.

Control module 62 may then determine whether the operating conditions are appropriate to release stored $NH_3$ from reductant storage device 54 based on the temperature of the SCR device 30 ($T_{SCR}$ (Step 208a). When $T_{SCR}$ is less than a first temperature threshold ($T_1$), nitrates may form on reductant storage device 54 and reduce the capacity of reductant storage device 54 to store $NH_3$. $T_1$ may be, for example, about 0-170° C., (e.g. 150° C.) and may be determined using the map stored within control module 62. Accordingly, valves 52 and 58 should remain closed (Step 210) until $T_{SCR}$ has achieved $T_1$. When $T_{SCR}$ is greater than or equal to $T_1$, control module 62 may then check whether $T_{RSD}$ is less than a temperature at which reductant storage device 54 releases $NH_3$ ($T_{Rel}$) (Step 208b). $T_{Rel}$ may vary depending on the storage materials selected for use in reductant storage device 54 and may be, for example, about 0-400° C. (e.g. about 300° C. for some materials) but may be higher or lower depending on the selected materials. $T_{Rel}$ may also vary depending on current operating conditions and may be determined using a map that relates $T_{Rel}$ to a function of $T_{RSD}$ and the amount of $NH_3$ stored on reductant storage device 54. Such a map may be generated according to any suitable process known in the art. Accordingly, when $T_{RSD}$ is below $T_{rel}$, control module 62 may then determine whether $T_{RSD}$ is greater than a temperature at which nitrates will form on reductant storage device 54 ($T_2$) (Step 208c). When $T_{RSD}$ is less than $T_2$, valves 52 and 58 should remain closed at step 210 to prevent nitrate formation on reductant storage device 54. When $T_{RSD}$ is greater than $T_2$, control module 62 may then check whether $T_{Exh}$ is greater than $T_{Rel}$ (Step 208d). When $T_{Exh}$ is less than $T_{Rel}$, valves 52 and 58 should remain closed at step 210 to prevent the temperature of the exhaust gases from influencing $T_{RSD}$ while control module 62 activates and/or adjusts heater 56 to quickly increase $T_{RSD}$ (Step 212). Heater 56 may apply heat (e.g. using an electric coil, induction heater, fuel-fired burner, etc.) to reductant storage device 54 to achieve and maintain $T_{Rel}$ and $T_2$. When $T_{Exh}$ is greater than $T_{Rel}$, control module may then open valves 52 and 58 and turn off heater 56 (Step 208e) in order to heat reductant storage device 54 with heat from the exhaust flow instead of with heater 56, which reduces the amount of energy consumed by aftertreatment system 20.

When $T_{RSD}$ is greater than $T_{Rel}$ at step 208b, control module may then check whether $T_{RSD}$ is greater than or equal to $T_2$ to prevent nitrate formation on reductant storage device 54. When $T_{RSD}$ is less than $T_2$, control module may proceed to step 210. When $T_{RSD}$ is greater than or equal to $T_2$, control module may then open valves 52 and 58 and adjust heater 56

When an adjustment is made at step 212 following any of steps 208a-f, control module 62 may return to step 202 and repeat steps 202-212 until conditions at steps 208a, 208b, and 208f are satisfied. In this way, reductant storage device may be quickly and efficiently heated without imposing a thermal burden on heater 56, which would require additional energy to heat reductant storage device 54 and to combat the influence of the colder exhaust flow temperature.

Following step 208f, control module 62 may open valves 52 and 58 to divert exhaust gases (e.g. engine exhaust, reductant, ammonia, etc.) into bypass conduit 48 to release stored $NH_3$ from reductant storage device 54 into exhaust conduit 26 (Step 214). Valves 52 and 58 may be opened to a position to achieve a desired flow rate through bypass conduit 48. Control module 62 may use a map to determine the appropriate positions of valves 52 and 58 to achieve the desired flow rate. Such a map may relate the desired flow rate to the valve positions, $T_{Exh}$, a flow rate of the exhaust flow in exhaust passage 26, $NH_3$ concentration downstream of reductant storage device 54, and $NH_3$ in the exhaust flow downstream of injector 34. Such a map may be generated by empirical data, modeling techniques, or another process. Control module 62 may then set a FILL FLAG to an "on" position (Step 216) to indicate that some of the stored $NH_3$ has been released from reductant storage device 54, which may be replaced. The FILL FLAG may also be set to the "on" position after step 208e. With valves 52 and 58 open following step 216 (based either on step 208e or 214), the $NH_3$ concentration (θ) downstream of reductant storage device 54 may begin to increase.

To determine whether a sufficient amount of $NH_3$ is being released into exhaust passage 26, control module 62 may check $NH_3$ concentration θ by receiving a signal from sensor 70 or otherwise determining θ based on current operating conditions (Step 218). Checking θ includes checking whether a desired amount of $NH_3$ is being released from reductant storage device 54. This may include comparing a measured concentration to an expected and/or desired concentration and determining whether the difference is within a tolerable range for achieving a desired θ value. Other ways of checking θ known in the art may be used. Control module 62 may determine whether reductant storage device 54 is empty by comparing θ to the $NH_3$ requirement and injection amount determined in step 202 (Step 220). Further, by continually monitoring θ, control module 62 may also determine a rate of change of θ to determine whether $NH_3$ within reductant storage device 54 has been depleted. Other methods of determining whether reductant storage device 54 is empty may be used. When reductant storage device 54 is empty, control module 62 may close valves 52 and 58, shut off heater 56, set an EMPTY FLAG to an "on" position, and end injection process 200 (Step 224) to prevent damage to reductant storage device 54. When reductant storage device 54 is not empty, control module may adjust valves 52 and 58 (using the map referred to with regard to step 214) as well as heater 56 to correct the flow of $NH_3$ into exhaust conduit 26 if needed (Step 222) and return to step 200 to repeat steps 202-220.

During step 220, control module 62 may determine the power output of heater 56 (e.g. by monitoring current of an electric coil/induction heater or the fuel consumption of a fuel-fired burner). The power output may indicate whether a thermal burden is being placed on heater 56 by the exhaust diverted by valves 52 and 58. Accordingly, control module 62 may adjust the power output of heater 56 and the positions of valves 52 and 58 based on the $NH_3$ concentration θ and the power output of heater 56 in order to divert a portion of the exhaust gases from exhaust passage 26 into bypass conduit 48 such that an appropriate amount of $NH_3$ is released while reducing the thermal burden on heater 56. In this way, control module 62 may cause a sufficient flow of $NH_3$ to be administered into exhaust passage 26 while reducing the energy consumed by heater 56 and improving the overall efficiency of aftertreatment system 20.

Steps 202-222 may be repeated until the reductant storage device becomes empty or until stored $NH_3$ from reductant storage device 54 is no longer needed at step 204. As discussed above, when reductant storage device 54 becomes empty, such as during a long idle, control module 62 may close valves 52 and 58, shut off heater 56, and set an EMPTY FLAG to an "on" position (Step 224). The EMPTY FLAG may be used in later steps to indicate that reductant storage device 54 should be refilled. To prepare for future refilling, control module may then check whether $T_{Exh}$ is less than $T_{RSD}$ (Step 226). If $T_{Exh}$ is less than $T_{RSD}$, then control module 62 may open valves 52 and 58 to reduce the temperature of reductant storage device 54 using the cooler exhaust flow (Step 228). When $T_{Exh}$ is not less than $T_{RSD}$, then injection process 200 may be ended to prevent damage to reductant storage device 54 by overheating it. If injection process 200 is initiated again by control module 62, control module 62 may advance to step 302 to perform a second injection process 300 (referring to FIG. 3) when the EMPTY FLAG is not in the "off" position during step 204.

$NH_3$, from reductant storage device 54 may no longer be needed, for example, when current operating conditions (e.g. exhaust flow rate, $NO_x$ concentration, reductant flow rate, etc.) are suitable for decomposing injected reductant to fully produce the determined amount of $NH_3$ needed to sufficiently reduce $NO_x$ levels in the exhaust flow. Control module 62 may determine when additional $NH_3$ from reductant storage device is no longer needed based on a map that correlates $NO_x$ reduction, reductant decomposition, and deposit formation with current operating conditions, such as $NO_x$ concentration, exhaust flow rate, reductant flow rate, and a second exhaust temperature threshold ($T_{Inj2}$). $T_{Inj2}$ may be a minimum temperature for using only reductant injection to supply $NH_3$. For a given set of operating conditions, $T_{Inj2}$ may represent an exhaust temperature above which the determined amount of reductant needed to produce enough $NH_3$ to sufficiently reduce $NO_x$ levels can be decomposed by the heat in the exhaust flow. $T_{Inj2}$ may vary depending on the current operating conditions, and may generally be about 225-350° C. (e.g. 300° C.) in some embodiments. When control module determines upon returning to step 204 that either the EMPTY FLAG is "on" or $NH_3$ from reductant storage device is no longer needed, a second injection process 300, as seen in FIG. 3, may be initiated.

Figure 3:
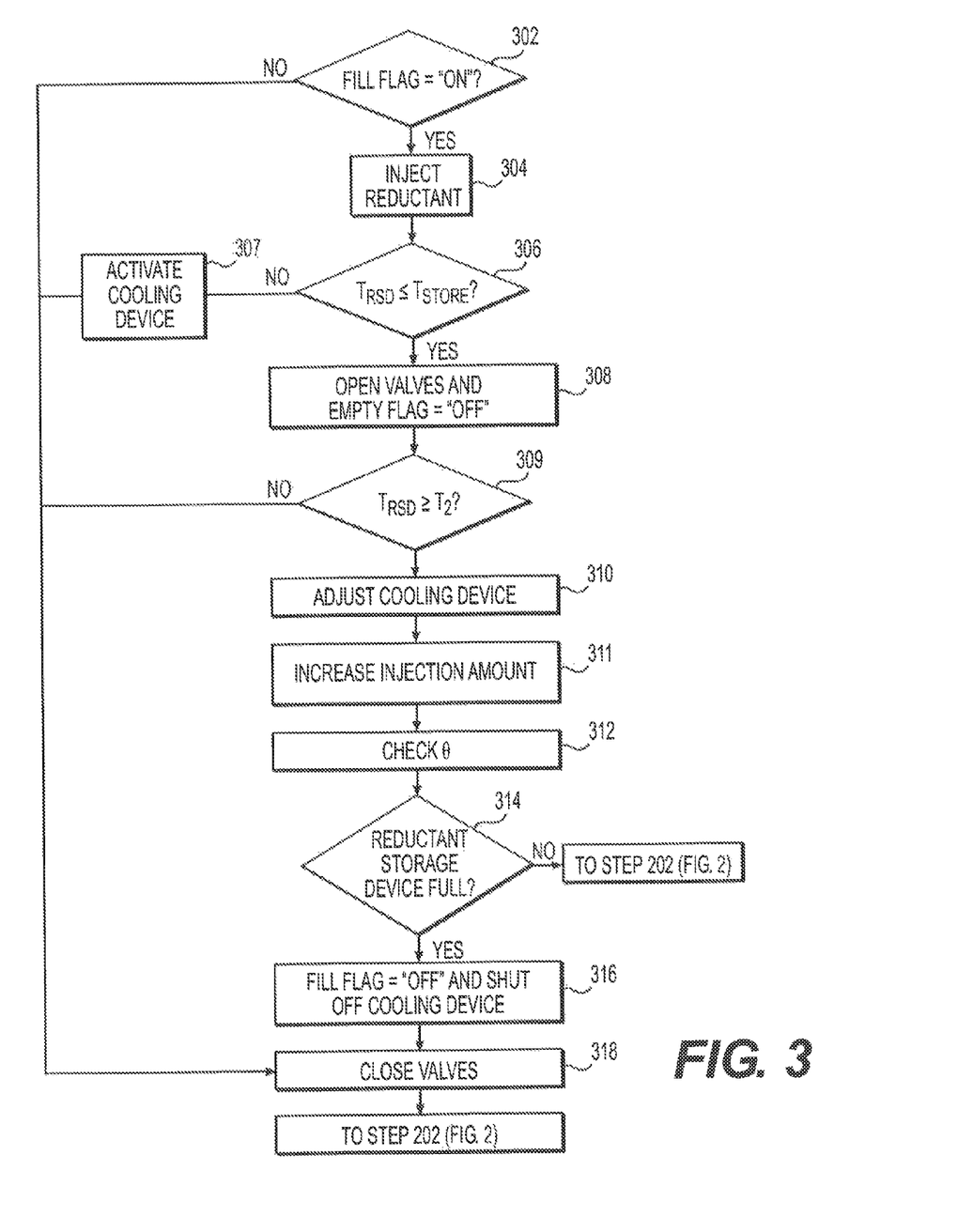
FIG. 3 is a flow chart of an exemplary disclosed process for storing reductant that may be performed with the aftertreatment system of FIG. 1.

FIG. 3 shows an exemplary injection process 300 that may be performed by control module 62 to continue injecting reductant after reductant storage device 54 has been emptied and to replenish reductant storage device 54 with additional $NH_3$. For example, control module 62 may determine whether the FILL FLAG is in an "on" position (Step 302). As discussed above, the FILL FLAG may have been set to the "on" position after valves 52 and 58 were opened to release $NH_3$ from reductant storage device 54. When the FILL FLAG is not in the "on" position, control module 62 may ensure valves 52 and 58 are closed (Step 318), and end process 300 by returning to step 202 to determine new injection parameters.

When the FILL FLAG is in the "on" position, command injector 34 to inject the amount of reductant determined in step 202 (referring to FIG. 2) (Step 304). Control module 62 may then determine whether $T_{RSD}$ is equal to or below a temperature that is suitable for storing $NH_3$ in reductant storage device 54 (Step 306). Generally, $NH_3$ storage materials can store more $NH_3$ at lower temperatures. Accordingly, a storage temperature threshold ($T_{store}$) may be stored within control module 62, which represents a temperature below which reductant storage device 54 can store a sufficient amount of $NH_3$ for subsequent cold start conditions. $T_{store}$ may vary depending on the storage materials used within reductant storage device, and may be, for example, about 0-400° C. for some materials. $T_{store}$ may be higher or lower depending on the storage materials within reductant storage device 54. $T_{store}$ may vary under for different operating conditions and may be determined using a map that relates $T_{store}$ as a function $T_{RSD}$ and the amount of $NH_3$ stored on reductant storage device 54. Such a map may be generated using empirical data, modeling, or by another suitable process.

When $T_{RSD}$ is above $T_{store}$, control module 62 may activate cooling device 57 in order to lower $T_{RSD}$ (Step 307). For example, control module 62 may activate a pump for circulating a coolant fluid (e.g., liquid coolant, air, etc.) through cooling device 57 to exchange heat with reductant storage device 54. Alternatively, control module 62 may, for example, activate a thermoelectric cooling device in contact with reductant storage device. After activating cooling device 57, control module 62 may ensure valves 52 and 58 are closed at step 318 and end process 300 by returning to step 202 to determine new injection parameters. In this way, the appropriate amount of reductant is injected while reductant storage device 54 is being cooled. Further, closing valves 52 and 58 prevents warm exhaust from increasing the thermal burden on cooling device 57 as it cools reductant storage device 54.

When $T_{RSD}$ is equal to or below $T_{store}$ at step 306, control module 62 may then open valves 52 and 58 (Step 308) to divert exhaust gases, including a mixture of engine exhaust and reductant that has decomposed to form $NH_3$, into bypass conduit 48. Control module 62 may also set the EMPTY FLAG to the "off" position, indicating that reductant storage device 54 is no longer empty, thereby permitting the use of stored $NH_3$ during subsequent cold start conditions. However, the FILL FLAG may remain in the "on" position despite the FILL FLAG being set to the "off" position. Control module 62 may then check to make sure $T_{RSD}$ is greater than or equal to $T_2$ before attempting to refill reductant storage device 54 (Step 309). When $T_{RSD}$ is less than $T_2$, control module 62 may proceed to step 318 to close valves 52 and 58 to prevent nitrate formation. When $T_{RSD}$ is greater than or equal to $T_2$, control module 62 may proceed to refill reductant storage device 54. With valves 52 and 58 open, the exhaust gases may be warmer than reductant storage device 54. Accordingly, control module 62 may then adjust cooling device 57 to maintain $T_{RSD}$ equal to or below $T_{store}$ (Step 310).

To provide additional $NH_3$ to store within reductant storage device 54, control module 62 may then increase the injection amount that was previously determined in step 202 (referring to FIG. 2) to an amount that is greater than necessary to produce enough $NH_3$ to sufficiently reduce $NO_x$ levels (Step 311). By increasing the injection amount, additional reductant may be sprayed by injector 34, which may decompose to form more $NH_3$ (and other byproducts) than is required by SCR device 30 to reduce $NO_x$ emissions. The additional $NH_3$ may be stored within reductant storage device 54 until it becomes full.

To determine when reductant storage device 54 has been filled, control module 62 may determine the current $NH_3$ concentration θ downstream of reductant storage device 54 (Step 312), for example, based on the signal from sensor 70. Checking θ includes checking whether a desired amount of $NH_3$ is being released from reductant storage device 54. This may include comparing a measured concentration to an expected and/or desired concentration and determining whether the difference is within a tolerable range for achieving a desired θ value. Other ways of checking θ may be used. Control module 62 may then determine whether $NH_3$ concentration θ is greater than or equal to a threshold ($θ_R$) to determine whether reductant storage device 54 is full (Step 314). When θ is less than OR, reductant storage device 54 may not be full and may continue to store $NH_3$. Control module 62 may then return to step 202 of process 200 (referring to FIG. 2) to determine a new reductant injection amount based on the foregoing steps and repeat process 300, if appropriate.

Step 314 may include additional or alternative methods of determining whether reductant storage device 54 is full. For example, control module 62 may also monitor the rate of change of θ over a period of time and determine that reductant storage device 54 is full when θ begins to sharply increase. As long as the $NH_3$ concentration θ remains steady, reductant storage device 54 may continue to store $NH_3$. However, when the $NH_3$ concentration θ downstream of reductant storage device 54 increases, control module 62 may indicate that reductant storage device 54 is full. Alternatively, control module 62 may determine that reductant storage device 54 is full based on a map that correlates $NH_3$ storage with operating conditions, such as the reductant flow rate through injector 34, injection history, exhaust flow rate, $T_{RSD}$, etc.

When control module 62 determines that reductant storage device 54 is full, control module 62 may then set the FILL FLAG to an "off" position and shut off cooling device 57 (Step 316). Control module 62 may then close valves 52 and 58 to prevent loss of the stored $NH_3$ (Step 318), and end process 300. Reductant storage device may then be full and ready for use during the next cold start.

As discussed, the disclosed aftertreatment system 20 may be applicable to engines having exhaust systems where it is beneficial to store reductant for use under cold start conditions. In particular, the disclosed aftertreatment system 20 may allow reductant storage device 54 to be optimally designed for storing $NH_3$ under varying conditions. Further, the disclosed aftertreatment system 20 may allow reductant storage device 54, heater 56, and cooling device 57 to be placed some distance from exhaust passage 26. In this way, aftertreatment system may be integrated into exhaust systems and/or engine systems having strict packaging constraints, and cooling, heating, and storing reductant in reductant storage device 54 may be performed with improved efficiency.

It will be apparent to those skilled in the art that various modifications and variations can be made to the disclosed aftertreatment system. Other embodiments will be apparent to those skilled in the art from consideration of the specification and practice of the disclosed aftertreatment system. It is intended that the specification and examples be considered as exemplary only, with a true scope being indicated by the following claims and their equivalents.

What is claimed is:

1. An aftertreatment system for an engine, comprising:
   an exhaust passage configured to receive an exhaust flow from the engine;
   an injector disposed in the exhaust passage and configured to inject a reductant into the exhaust flow;
   a bypass conduit fluidly connected to the exhaust passage downstream of the injector;
   at least one valve disposed in the bypass conduit and configured to divert exhaust gases from the exhaust passage into the bypass conduit;
   a reductant storage device disposed in the bypass conduit and configured to store ammonia in the exhaust gases;
   a control module configured to selectively operate the at least one valve;
   a first sensor configured to indicate a temperature of the exhaust flow; and
   a second sensor configured to indicate a temperature of the reductant storage device, wherein the first and second sensors are electronically connected to the control module;
   wherein the control module is further configured to open the at least one valve when:
   the temperature of the exhaust flow is above a first threshold; and
   the temperature of the reductant storage device is above a release temperature.

2. The aftertreatment system of claim 1, further including a heater disposed in the bypass conduit and configured to heat the reductant storage device, wherein the heater is electronically connected to the control module.

3. The aftertreatment system of claim 2, wherein the control module is further configured to selectively open the at least one valve based on a power output of the heater.

4. The aftertreatment system of claim 2, wherein the control module is further configured to activate the heater when the temperature of the reductant storage device is below a release temperature.

5. The aftertreatment system of claim 1, further including a cooling device disposed in the bypass conduit and configured to cool the reductant storage device, wherein the cooling device is in communication with the control module.

6. The aftertreatment system of claim 5, wherein the control module is further configured to activate the cooling device when the temperature of the reductant storage device is above a storage temperature.

7. The aftertreatment system of claim 1, wherein the control module is further configured to:
   determine an ammonia concentration downstream of the reductant storage device; and
   selectively operate the at least one valve based on the ammonia concentration.

8. The aftertreatment system of claim 1, further including a reduction device disposed in the exhaust passage downstream of the bypass conduit and configured to receive ammonia released from the reductant storage device.

9. A method of treating exhaust from an engine, comprising:
- receiving an exhaust flow from the engine;
- selectively injecting a reductant into the exhaust flow;
- directing the exhaust flow and reductant to a reduction device;
- selectively diverting exhaust gases to a reductant storage device;
- selectively releasing ammonia from the reductant storage device to the reduction device;
- determining a temperature of the exhaust flow; and
- determining a temperature of the reductant storage device, wherein:
  - diverting the exhaust gases includes diverting the exhaust gases when:
    - the temperature of the exhaust flow is above a first threshold; and
    - the temperature of the reductant storage device is above a release temperature.

10. The method of claim 9, further including inhibiting the exhaust gases from being diverted when the temperature of the exhaust flow is above a second threshold.

11. The method of claim 9, further including selectively heating the reductant storage device when the temperature of the reductant storage device is above the release temperature.

12. The method of claim 11, further including monitoring a power used to heat the reductant storage device, wherein diverting the exhaust gases includes diverting the exhaust gases based on the power.

13. The method of claim 9, further including:
- determining a reductant concentration downstream of the reductant storage device; and
- inhibiting exhaust gases from being diverted based on the reductant concentration.

14. The method of claim 9, wherein injecting the reductant includes injecting the reductant when the temperature of the exhaust flow is greater than or equal to a minimum injection temperature.

15. The method of claim 9, wherein selectively releasing ammonia from the reductant storage device includes selectively releasing ammonia from the reductant storage device when the temperature of the exhaust flow is above the first threshold.

16. The method of claim 9, further including selectively cooling the reductant storage device when the temperature of the reductant storage device is above a storage temperature.

17. An engine comprising:
- an engine block at least partially defining a plurality of cylinders;
- an exhaust system connected to the engine and including:
  - an exhaust passage configured to receive an exhaust flow from the plurality of cylinders;
  - a first sensor configured to indicate a temperature of the exhaust flow;
  - an injector disposed in the exhaust passage and configured to inject a reductant into the exhaust flow;
  - a bypass conduit fluidly connected to the exhaust passage downstream of the injector;
  - at least one valve disposed in the bypass conduit and configured to divert exhaust gases from the exhaust passage into the bypass conduit;
  - a reductant storage device disposed in the bypass conduit and configured to store ammonia from the exhaust gases;
  - a second sensor configured to indicate a temperature of the reductant storage device;
  - a control module configured to selectively operate the at least one valve based on the temperature of the exhaust flow and on the temperature of the reductant storage device; and
  - a reduction device disposed in the exhaust passage downstream of the bypass conduit and configured to receive ammonia released from the reductant storage device.

* * * * *